(12) United States Patent
Takahashi

(10) Patent No.: US 12,461,256 B2
(45) Date of Patent: Nov. 4, 2025

(54) SCATTER GRID FREQUENCY CORRECTION IN A RADIATION IMAGING APPARATUS, METHOD OF CONTROLLING SAME, RADIATION IMAGING SYSTEM, AND STORAGE MEDIUM

(71) Applicant: CANON KABUSHIKI KAISHA, Tokyo (JP)

(72) Inventor: Naoto Takahashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 232 days.

(21) Appl. No.: 18/358,982

(22) Filed: Jul. 26, 2023

(65) Prior Publication Data

US 2024/0053495 A1 Feb. 15, 2024

(30) Foreign Application Priority Data

Aug. 10, 2022 (JP) .................................. 2022-128385

(51) Int. Cl.
*G01T 1/24* (2006.01)

(52) U.S. Cl.
CPC .................................... *G01T 1/243* (2013.01)

(58) Field of Classification Search
CPC ...................................................... G01T 1/243
See application file for complete search history.

(56) References Cited

U.S. PATENT DOCUMENTS

| | | | | |
|---|---|---|---|---|
| 6,282,264 B1* | 8/2001 | Smith | .................... | A61B 6/488 378/177 |
| 6,625,253 B1* | 9/2003 | Barnes | .................... | G21K 1/025 378/154 |
| 8,837,516 B2 | 9/2014 | Umehara | | |
| 2001/0033638 A1* | 10/2001 | Inoue | .................... | G01T 1/2928 378/154 |
| 2002/0080921 A1* | 6/2002 | Smith | .................. | A61B 6/4291 378/189 |
| 2003/0042444 A1* | 3/2003 | Tsujii | .................... | G01N 23/20 250/582 |
| 2004/0101101 A1* | 5/2004 | Hirai | .................... | G01T 1/20185 378/98.7 |
| 2006/0054833 A1* | 3/2006 | Tsuchino | ............. | A61B 6/4291 250/370.11 |
| 2006/0242094 A1* | 10/2006 | Tamakoshi | ............... | A61B 6/56 706/23 |
| 2006/0261296 A1* | 11/2006 | Heath | .................... | G03B 42/02 250/580 |

(Continued)

FOREIGN PATENT DOCUMENTS

JP 2013-236918 A 11/2013
JP 2014-150844 A 8/2014

*Primary Examiner* — Blake C Riddick
(74) *Attorney, Agent, or Firm* — Carter, DeLuca & Farrell LLP

(57) ABSTRACT

A radiation imaging apparatus comprises a radiation detector including a plurality of pixels configured to convert radiation into electrical signals, one or more of the plurality of pixels being configured to operate as a detecting pixel for detecting irradiation amounts of the radiation. The radiation imaging apparatus reduces a frequency component relating to grid stripes produced by a scattering ray removing grid included in detection values for the irradiation amounts of the radiation obtained from the plurality of detecting pixels forming a detecting pixel group.

20 Claims, 10 Drawing Sheets

(56) References Cited

U.S. PATENT DOCUMENTS

| | | | |
|---|---|---|---|
| 2007/0003125 A1* | 1/2007 | Behiels | A61B 6/5258 382/132 |
| 2007/0019847 A1* | 1/2007 | Inoue | G06T 5/70 382/128 |
| 2008/0152088 A1* | 6/2008 | Wang | H04N 5/2624 378/98.12 |
| 2009/0034683 A1* | 2/2009 | Tamakoshi | G03B 42/02 378/91 |
| 2009/0060136 A1* | 3/2009 | Tamakoshi | H04N 23/651 378/91 |
| 2011/0180717 A1* | 7/2011 | Okada | H04N 25/76 250/370.08 |
| 2012/0138810 A1* | 6/2012 | Okada | G01T 1/20184 250/394 |
| 2012/0241629 A1* | 9/2012 | Kuwabara | A61B 6/4291 250/362 |
| 2012/0305791 A1* | 12/2012 | Watanabe | G01T 1/208 250/394 |
| 2013/0004042 A1* | 1/2013 | Yang | A61B 6/032 382/131 |
| 2013/0009069 A1* | 1/2013 | Okada | G01T 1/243 250/370.09 |
| 2013/0077744 A1* | 3/2013 | Kamiya | A61B 6/548 378/62 |
| 2013/0136234 A1* | 5/2013 | Noma | H04N 25/671 378/91 |
| 2013/0148782 A1* | 6/2013 | Tajima | A61B 6/548 378/62 |
| 2013/0208852 A1* | 8/2013 | Koishi | A61B 6/5288 378/19 |
| 2013/0208860 A1* | 8/2013 | Sugizaki | A61B 6/4233 378/62 |
| 2013/0223592 A1* | 8/2013 | Sato | H04N 25/30 378/97 |
| 2014/0010353 A1* | 1/2014 | Lalena | A61B 6/465 378/207 |
| 2014/0084175 A1* | 3/2014 | Ito | H04N 23/30 250/370.09 |
| 2014/0086472 A1* | 3/2014 | Hasegawa | G06T 5/70 378/62 |
| 2014/0239188 A1* | 8/2014 | Tezuka | G01T 1/17 250/394 |
| 2015/0055752 A1* | 2/2015 | Takahashi | H04N 25/67 378/91 |
| 2015/0153464 A1* | 6/2015 | Imamura | H04N 23/30 378/207 |
| 2015/0164458 A1* | 6/2015 | Tajima | H05G 1/38 378/97 |
| 2015/0182182 A1* | 7/2015 | Tajima | A61B 6/542 378/189 |
| 2015/0189194 A1* | 7/2015 | Tajima | H04N 5/32 378/62 |
| 2015/0192684 A1* | 7/2015 | Ito | G01T 7/005 250/361 R |
| 2015/0317771 A1* | 11/2015 | Kato | G06T 5/10 378/62 |
| 2016/0302752 A1* | 10/2016 | Ito | G06T 5/40 |
| 2016/0354046 A1* | 12/2016 | Freudenberger | A61B 6/5252 |
| 2017/0287582 A1* | 10/2017 | Kotian | A61B 6/4494 |
| 2018/0055464 A1* | 3/2018 | Watanabe | H04N 25/30 |
| 2018/0140264 A1* | 5/2018 | Fujiyoshi | G01T 1/247 |
| 2018/0292545 A1* | 10/2018 | Asai | H02J 7/0068 |
| 2019/0231299 A1* | 8/2019 | Lalena | A61B 6/465 |
| 2019/0324156 A1* | 10/2019 | Miura | A61B 6/4233 |
| 2020/0166659 A1* | 5/2020 | Fujiyoshi | G01T 1/247 |
| 2021/0133979 A1 | 5/2021 | Takahashi | |
| 2021/0243389 A1* | 8/2021 | Sawada | G01T 1/2921 |
| 2021/0378621 A1* | 12/2021 | Ohta | A61B 6/563 |
| 2022/0189141 A1 | 6/2022 | Takahashi | |
| 2023/0070520 A1 | 3/2023 | Takahashi | |

* cited by examiner

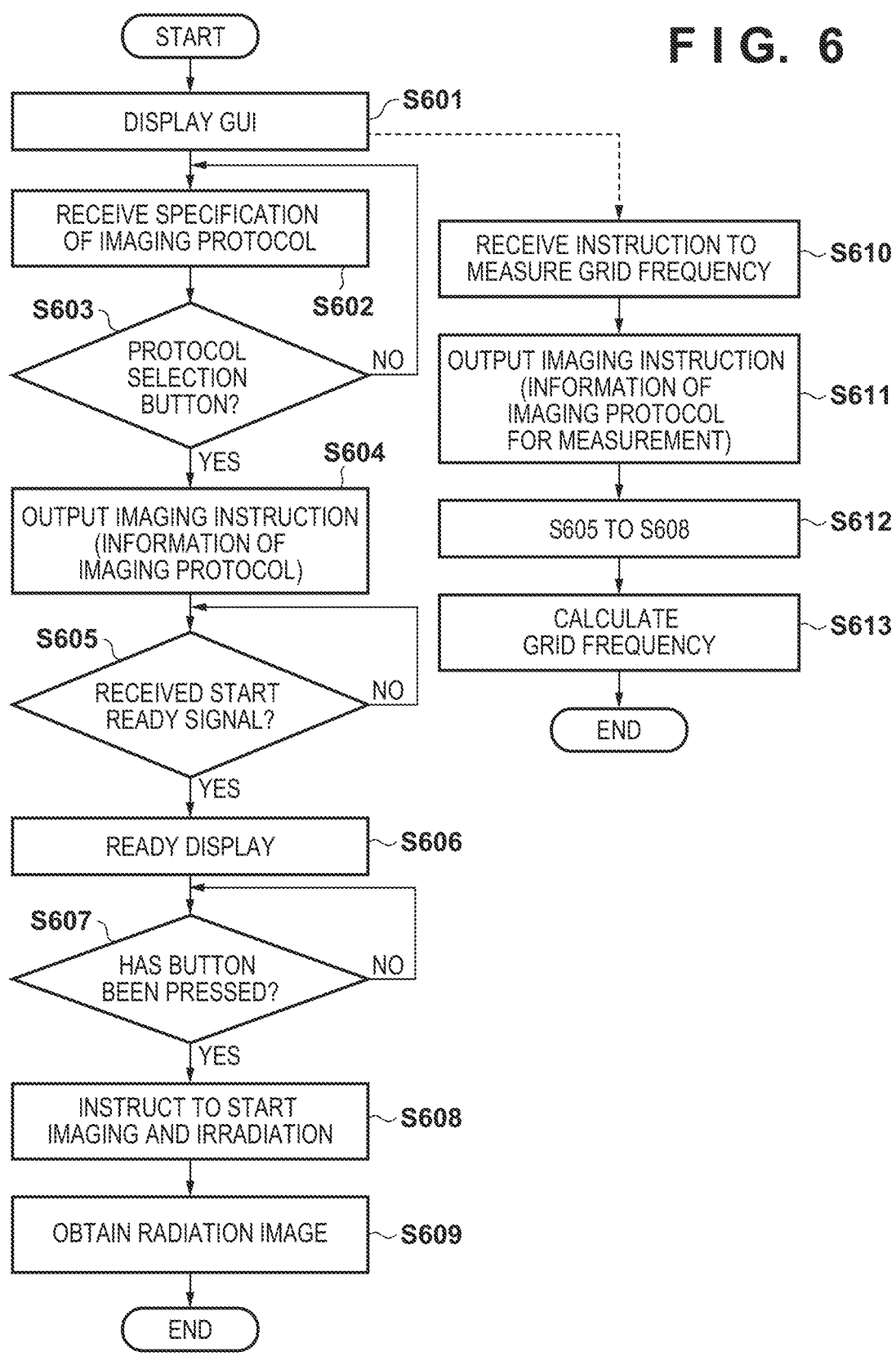

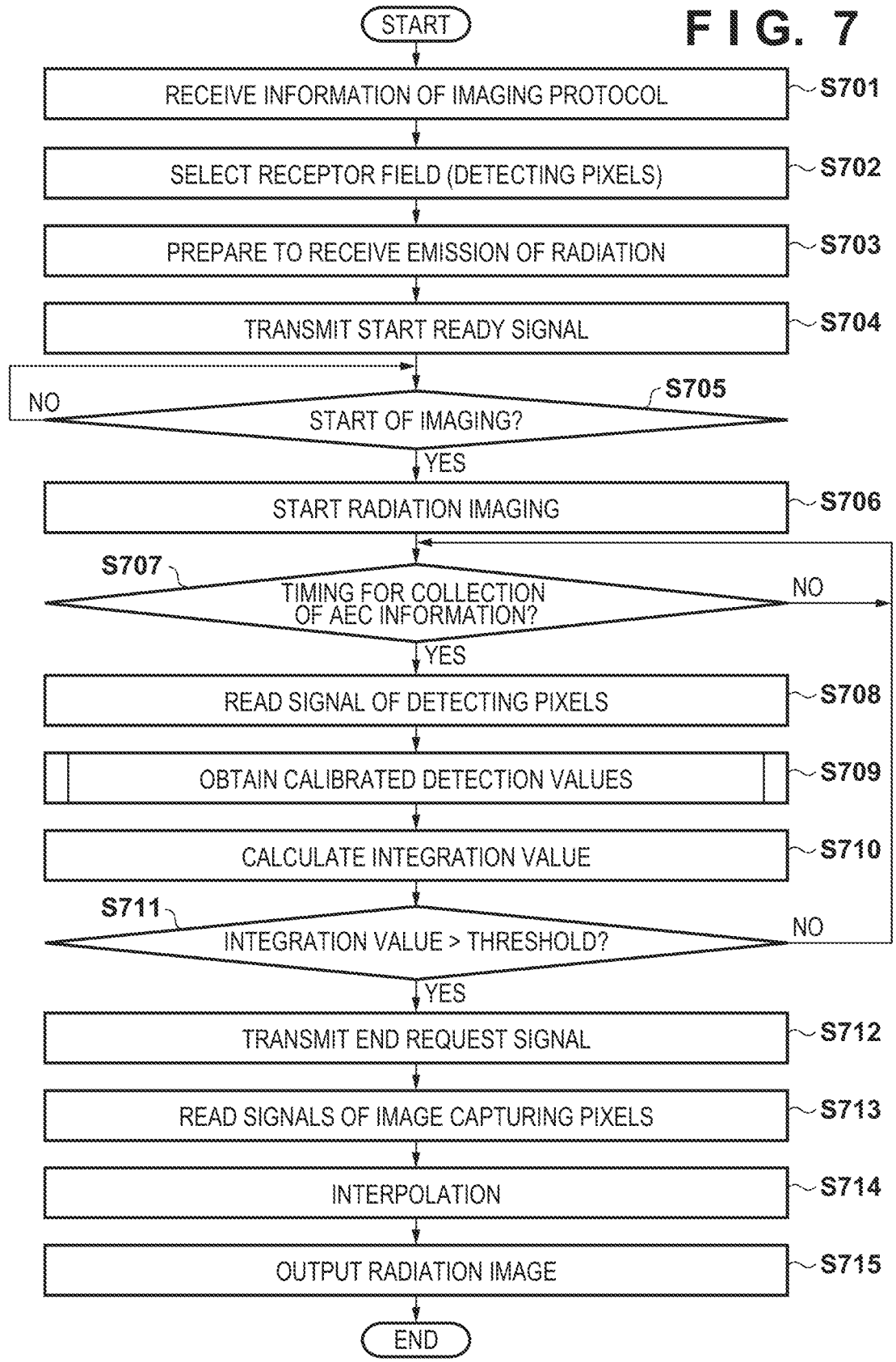

POWER SPECTRUM OF DIRECTION
ORTHOGONAL TO STRIPES

FILTER CHARACTERISTIC OF
WEIGHTED SUM OF 3 PIXELS

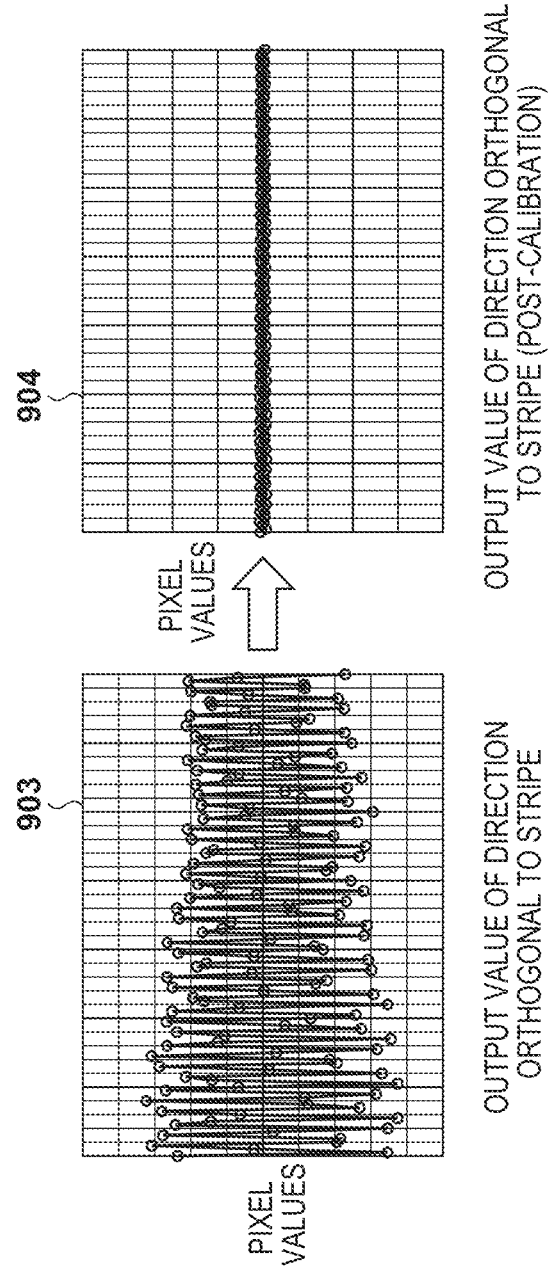

SCATTER GRID FREQUENCY CORRECTION IN A RADIATION IMAGING APPARATUS, METHOD OF CONTROLLING SAME, RADIATION IMAGING SYSTEM, AND STORAGE MEDIUM

BACKGROUND OF THE INVENTION

Field of the Invention

The present disclosure relates to a radiation imaging apparatus, a method of controlling the same, a radiation imaging system, and a program.

Description of the Related Art

A technique for irradiating radiation represented by X-rays at a subject and converting the radiation that passes through the subject into an image via a flat panel detector (hereinafter referred to as FPD) is known in the medical field. Also, radiation imaging apparatuses with a built-in Automatic Exposure Control (AEC) function are increasingly being put to practical use. A radiation imaging apparatus with AEC can measure the radiation dose during irradiation and control when to stop irradiation according to the measurement result. Such a radiation imaging apparatus, for example, monitors the radiation dose by rapidly reading out signals from pixels (hereinafter, referred to as detecting pixels) set for radiation detection during radiation irradiation.

Scattering rays are also generated within the subject by the radiation. Thus, when imaging, a grid for reducing scattering rays may be placed between the subject and the FPD. The grid is formed of a radiation shielding material such as lead and a radiation transparent material, such as aluminum or carbon, alternately arranged at a predetermined width. When monitoring the radiation dose using detecting pixels with such a grid installed, a difference in the signal amount detected by the detecting pixels may be caused by the radiation shielding materials of the grid and the detecting pixels overlapping. This problematically reduces the accuracy of the AEC. In Japanese Patent Laid-Open No. 2013-236918, this problem is addressed by making the arrangement period of the detecting pixels and the arrangement period of the radiation shielding material of the grid different.

The present disclosure provides techniques for further enhancing the accuracy of AEC.

SUMMARY OF THE INVENTION

According to one aspect of the present invention, there is provided a radiation imaging apparatus, comprising: a radiation detector including a plurality of pixels configured to convert radiation into electrical signals, one or more of the plurality of pixels being configured to operate as a detecting pixel for detecting irradiation amounts of the radiation; and a reducing unit configured to reduce a frequency component relating to grid stripes produced by a scattering ray removing grid included in detection values for the irradiation amount of the radiation obtained from the plurality of detecting pixels forming a detecting pixel group.

Further features of the present invention will become apparent from the following description of exemplary embodiments with reference to the attached drawings.

BRIEF DESCRIPTION OF THE DRAWINGS

FIG. 6 is a flowchart illustrating the processing executed by an imaging control apparatus according to an embodiment.

FIG. 7 is a flowchart illustrating the processing executed by a radiation imaging apparatus according to an embodiment.

FIGS. 9A to 9C are diagrams for describing effects of a weighted sum according to an embodiment.

DESCRIPTION OF THE EMBODIMENTS

Figure 1:
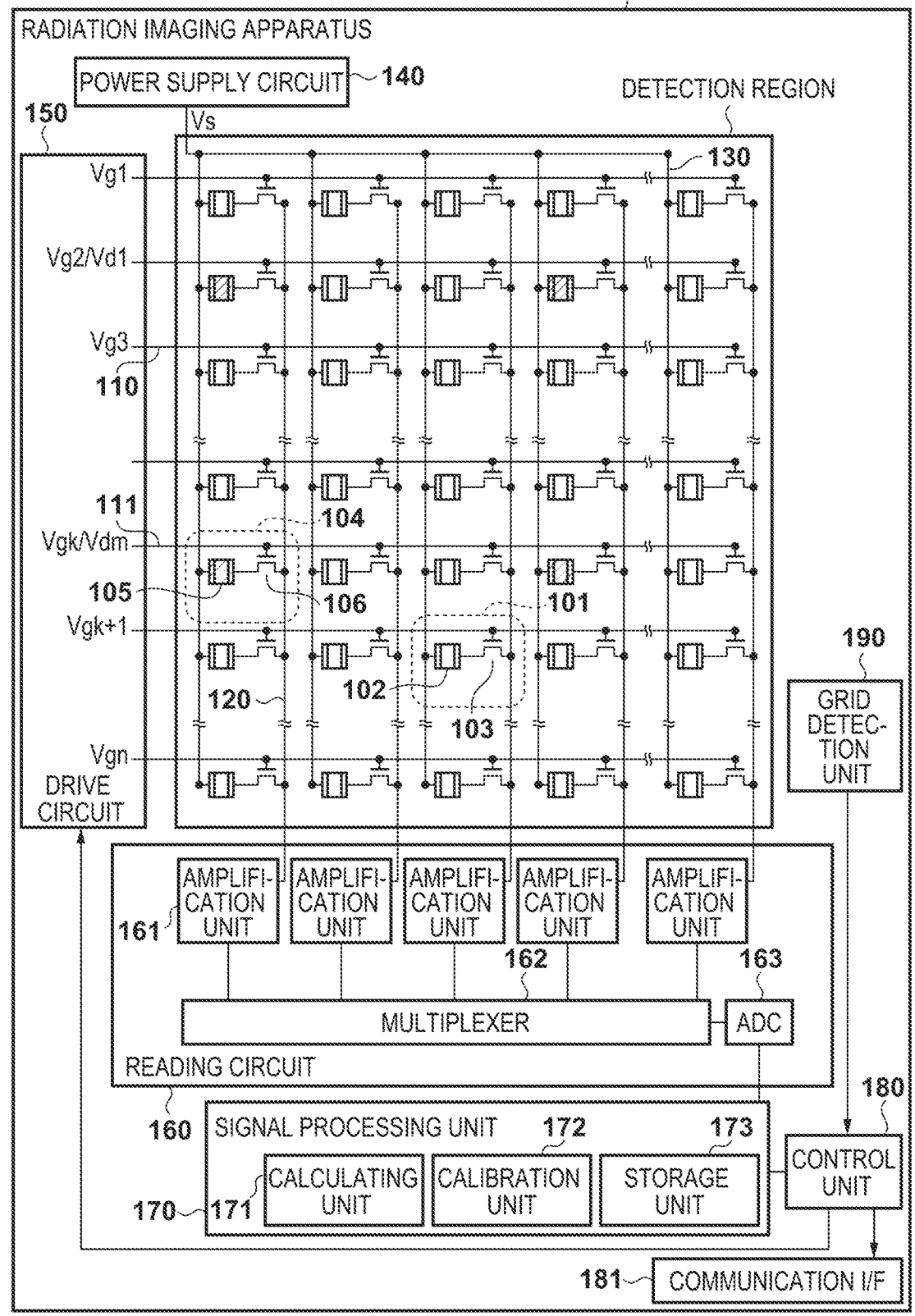
FIG. 1 is a diagram illustrating an example of the configuration of a radiation imaging apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In Japanese Patent Laid-Open No. 2013-236918, the arrangement period (for example, grid density) of the radiation shielding material of the grid is restricted by the arrangement period of the detecting pixels, creating a problem that a discretionary arrangement period cannot be supported. Also, simply by making the arrangement period of the radiation shielding material and the arrangement period of the detecting pixels different, the effects of the grid cannot be sufficiently reduced. This means that a sufficient accuracy enhancing effect may not be realized.

According to one aspect of the present disclosure, techniques are provided for reducing the effects of the scattering ray removing grid when detecting the dose of radiation for Automatic Exposure Control (AEC).

Note that X-ray radiation is typically used in medical imaging, but the radiation according to the present disclosure is not limited thereto. Radiation according to the present disclosure includes α-rays, β-rays, and γ-rays, which are beams of particles (including photons) emitted due to radioactive decay, as well as beams with energy approximately equal to or greater than these, such as a particle beam and cosmic rays.

FIG. 1 is a diagram illustrating an example of the configuration of a radiation imaging apparatus 100 according to an embodiment. The radiation imaging apparatus 100 includes a radiation detector including a detection region in which a plurality of pixels that convert radiation into electrical signals are arranged to form a plurality of rows and a plurality of columns, a plurality of drive lines 110, and a plurality of signal lines 120. The plurality of drive lines 110 are arranged corresponding to the plurality of rows of pixels, and each drive line 110 corresponds to one of the pixel rows. The plurality of signal lines 120 are arranged corresponding to the plurality of columns of pixels, and each signal line 120 corresponds to one of the pixel columns.

The plurality of pixels include a plurality of imaging pixels 101 used to obtain a radiation image and one or more detecting pixels 104 used to monitor an irradiation amount of the radiation. The imaging pixels 101 each include a converting element 102 that converts radiation into an electrical signal and a switching element 103 that connects the signal line 120 and the converting element 102 to one another. The detecting pixels 104 each include a converting element 105 that converts radiation into an electrical signal and a switching element 106 that connects the signal line 120 and the converting element 105 to one another. The detecting pixels 104 are arranged to be included in the rows and columns formed by the plurality of imaging pixels 101.

A first electrode of the converting element 102 is connected to a first main electrode of the switching element 103, and a second electrode of the converting element 102 is connected to a bias line 130. The bias line 130 extends in the column direction and is connected to and shared by the second electrodes of the plurality of converting elements 102 arranged in the column direction. The bias line 130 receives a bias voltage Vs from a power supply circuit 140. Second main electrodes of the switching elements 103 of the imaging pixels 101 included in one column are connected to one signal line 120. Control electrodes of the switching elements 103 of the imaging pixels 101 included in one row are connected to one drive line 110. The detecting pixels 104 include a pixel configuration similar to that of the imaging pixels 101 and are connected to the drive lines 110 and the signal lines 120.

A drive circuit 150 is configured to supply a drive signal to the pixels to be driven via the plurality of drive lines 110 according to a control signal from a control unit 180. The drive signal is a signal for turning on the switching element included in the pixels to be driven. In the present embodiment, the switching element of each pixel is turned on with a high level signal and off with a low level signal. Thus, the high level signal is referred to as the drive signal. By supplying the pixels with a drive signal, the signal accumulated at the converting element of the pixel is put in a state of being readable by a reading circuit 160. Note that of the drive lines 110, the drive lines 110 connected to the detecting pixels 104 are also referred to as detecting drive lines 111.

In the configuration illustrated in FIG. 1, the detecting pixels 104 and the imaging pixels 101 are connected to common detecting drive lines 111. This configuration is advantageous in terms of cost due to its simple circuit configuration. Also, the detecting pixels 104 can be used as imaging pixels when imaging without using AEC. However, when using AEC, since the imaging pixels 101 connected to the detecting drive lines 111 cannot be used as imaging pixels, the imaging pixels 101 must be treated as defective pixels. Regarding this, a configuration may be used in which the detecting pixels and the imaging pixels are connected to different drive lines and can be independently controlled. With this configuration, the circuit configuration becomes complex, but the detecting pixels can be controlled independently of the imaging pixels. Accordingly, even when AEC is used, there is no need to treat the pixels other than the detecting pixels as defective pixels, and all of the imaging pixels can be used. Also, the arrangement relationship with the imaging pixels does not need to be taken into account, giving the advantage of high flexibility in terms of arranging the detecting pixels. With either configuration, the radiation imaging apparatus 100 includes the plurality of imaging pixels for radiation imaging, and one or more of the plurality of imaging pixels can be operated as detecting pixels for detecting the irradiation amount of the radiation.

The reading circuit 160 is configured to read out the signals from the plurality of pixels via the plurality of signal lines 120. The reading circuit 160 includes a plurality of amplification units 161, a multiplexer 162, and an analog-to-digital converter (hereinafter referred to as an AD converter) 163. The plurality of signal lines 120 are each connected to a corresponding amplification unit 161 of the plurality of amplification units 161 of the reading circuit 160. There is a one to one correspondence between the signal lines 120 and the amplification units 161. The multiplexer 162 selects the plurality of amplification units 161 in a predetermined order and supplies the signals from the selected amplification units 161 to the A/D converter 163. The A/D converter 163 converts the signal supplied from the multiplexer 162 into a digital signal and outputs the digital signal.

In this manner, the signals read out from the imaging pixels 101 and the detecting pixels 104 and converted into digital signals are supplied to a signal processing unit 170. The signals read out from the imaging pixels 101 may be used as the pixel values of a radiation image. The signals read out from the detecting pixels 104 may be used as the detection values of the radiation dose. The signal processing unit 170 includes a calculating unit 171, a calibration unit 172, and a storage unit 173 and processes the signals read out from the imaging pixels 101 or the detecting pixels 104. Specifically, the calculating unit 171 generates a radiation image on the basis of the signals (pixel values) read out from the imaging pixels 101 and stores the radiation image in the storage unit 173. The radiation image stored in the storage unit 173 is read out by the control unit 180 and sent to an imaging control apparatus 250 via a communication I/F 181. The calibration unit 172 calibrates the signals read out from the detecting pixels 104 in order to reduce the effects of the scattering ray removing grid from the signals (detection values of the radiation dose) read out from the detecting pixels 104. The calculating unit 171 detects the irradiation of radiation to the radiation imaging apparatus 100 on the basis of the signals (detection values) calibrated by the calibration unit 172 and determines the integrated irradiation amount of the radiation. The calculating unit 171 obtains the integrated irradiation amount via integration of the determined integrated irradiation amount of the radiation. The signal processing unit 170 notifies the control unit 180 of information including the detection result of the radiation irradiation by the calculating unit 171, the integrated irradiation amount of the radiation, and the like.

The control unit 180 controls the drive circuit 150 and the reading circuit 160 on the basis of the information from the signal processing unit 170. The control unit 180, for example, implements AEC by controls the start and end of exposure (accumulation of charge corresponding to the irradiated radiation by the imaging pixels 101) on the basis of the information from the signal processing unit 170. Also, to determine the irradiation amount of the radiation, during radiation imaging, the control unit 180 controls the drive circuit 150 and the reading circuit 160 and repeatedly obtains the detection values from the detecting pixels 104. In obtaining the detection values, the control unit 180 controls the drive circuit 150 to scan the detecting drive lines 111 and enable a state in which the signals of the detecting pixels 104 are readable. Subsequently, the control unit 180 controls the reading circuit 160 to read out the signals of the columns corresponding to the detecting pixels 104. In this manner, the reading circuit 160 can read out the signals (detection values) from the detecting pixels 104 during radiation irradiation and output this as information indicating the irradiation amount of the radiation to the signal processing unit 170. Via these operations, the signal processing unit 170 of the radiation imaging apparatus 100 can obtain the irradiation information (integrated irradiation amount) of the detecting pixels 104 during radiation irradiation. The control unit 180 determines whether to end exposure by comparing the integrated irradiation amount from the signal processing unit 170 with a threshold.

A grid detection unit 190 detects whether or not a scattering ray removing grid is installed on the radiation imaging apparatus 100. When the grid detection unit 190 detects that a grid is installed, the control unit 180 performs control so that the calibration unit 172 calibrates the detection values from the detecting pixels 104.

Figure 2:
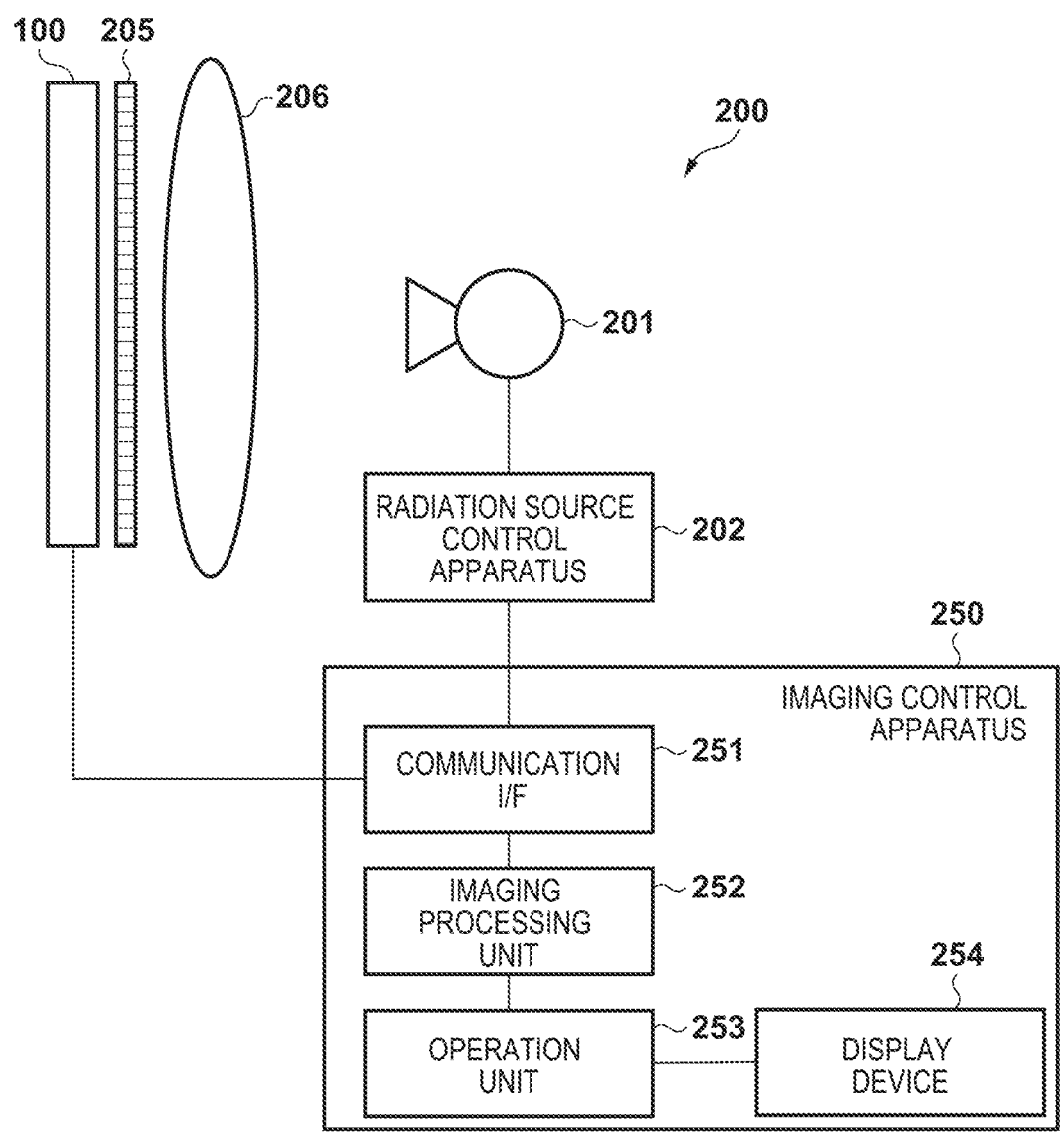
FIG. 2 is a diagram illustrating an example of the configuration of a radiation imaging system according to an embodiment.

FIG. 2 is a diagram illustrating an example of the configuration of a radiation imaging system 200 including the radiation imaging apparatus 100. The radiation imaging system 200 includes the radiation imaging apparatus 100 described above with reference to FIG. 1, a radiation source 201, a radiation source control apparatus 202, and the imaging control apparatus 250. The imaging control apparatus 250 includes a communication I/F 251, an imaging processing unit 252, an operation unit 253, and a display device 254. The imaging control apparatus 250, for example, is an information processing apparatus that implements the operations of the units by one or more processors (not illustrated) executing a predetermined program stored in a memory (not illustrated), such as a ROM or a RAM. The communication I/F 251 communicatively connects the radiation imaging apparatus 100, the radiation source control apparatus 202, and the imaging control apparatus 250. The communications between the communication I/F 251 and the communication I/F 181 may be wireless or wired. The operation unit 253 displays an operation screen on the display device 254 and provides a Graphical User Interface (GUI). Also, when imaging a subject 206, a scattering ray removing grid 205 is placed on the front surface of the radiation imaging apparatus 100 according to the body part to be imaged specified by an imaging protocol. Note that the radiation imaging apparatus 100 can perform radiation imaging using various types of grids corresponding to body parts and the like of the subject.

The operations of the radiation imaging in the radiation imaging system 200 described above will now be described. FIG. 6 is a flowchart for describing the imaging operations of the imaging control apparatus 250 according to an embodiment. Also, FIG. 7 is a flowchart for describing the operations of the radiation imaging apparatus 100 according to an embodiment.

First, the operation unit 253 of the imaging control apparatus 250 provides the GUI on the display device 254 and receives an instruction from an operator via the GUI (step S601). When the operator, via the GUI, specifies a single desired imaging protocol from among a plurality of pre-prepared imaging protocols, the imaging processing unit 252 receives the single desired imaging protocol via the operation unit 253 (step S602). An imaging protocol is a series of operational parameter sets used when performing a desired inspection, and by generating a plurality of imaging protocols in advance, condition settings in accordance with the inspection can be easily performed by the operator via the GUI. Various settings are associated with an imaging protocol. Such settings include, for example, body part to be imaged, imaging conditions, presence or absence of a grid, information indicating the characteristics (for example, grid density) of the grid to be used, and the like. Also, the imaging conditions include information including the tube voltage, the tube current, AEC information (for example, the dose corresponding to the threshold for determining the end of exposure and the receptor field (described below) used), the maximum irradiation time, the region of interest to monitor for the dose, and the like. Note that in the present embodiment, dose control (control of the tube voltage and the tube current and AEC control) is performed on the basis of the imaging conditions associated with the imaging protocol. Also, the calibration unit 172 calibrates the output value of the detecting pixels on the basis of the grid density included in the imaging protocol information (this will be described below in detail).

Subsequently, the imaging processing unit 252 determines whether or not an imaging instruction has been performed via the GUI (step S603). For example, when the operator presses a protocol selection button on the GUI, the imaging processing unit 252 determines that an imaging instruction has been performed (YES in step S603). In this case, the imaging processing unit 252 transmits, via the communication I/F 251, the imaging instruction including a start request signal and the specified imaging protocol information to the radiation imaging apparatus 100 and the radiation source control apparatus 202, that is an external apparatus (step S604).

When the radiation imaging apparatus 100 receives the start request signal from the imaging control apparatus 250, the radiation imaging apparatus 100 starts preparation to receive radiation irradiation (FIG. 7). Specifically, the control unit 180 receives the start request signal and the imaging protocol information from an external apparatus (for example, the imaging control apparatus 250) (step S701). The control unit 180 selects the detecting pixels to use for the AEC function on the basis of the receptor field information included in the imaging protocol information (step S702). The receptor field and receptor field selection will be described below. Note that the pixels not selected as detecting pixels are used as imaging pixels. Thereafter, the control unit 180 prepares to receive radiation irradiation by performing a reset operation for the pixels and the like (step S703) and transmits a start ready signal to the imaging control apparatus 250 and the radiation source control apparatus 202 via the communication I/F 251 when preparations are complete (step S704). The start ready signal is a signal for notifying that radiation can be irradiated. Thereafter, the control unit 180 waits for the start of imaging (step S705).

Returning to FIG. 6, when the imaging control apparatus 250 is notified of the start ready signal from an external apparatus (the radiation imaging apparatus 100), the operation unit 253 performs a ready display via the display device 254 (YES in step S605, step S606). After the operator checks the ready display of the display device 254, the operator presses a not-illustrated irradiation switch at the right imaging timing. When the start ready signal notification is sent and the irradiation switch is pressed (YES in step S607), the imaging processing unit 252 instructs the radiation source control apparatus 202 to start radiation irradiation and instructs the radiation imaging apparatus 100 to start radiation imaging (step S608). When the imaging by the radiation imaging apparatus 100 ends, the imaging control apparatus 250 obtains a radiation image from the radiation imaging apparatus 100 (step S609).

When the control unit 180 of the radiation imaging apparatus 100 determines that imaging has started (YES in step S705), radiation imaging (radiation detection) by the imaging pixels and the detecting pixels is started (step S706). Note that the radiation imaging apparatus 100 may start imaging operations via a signal (instruction to start radiation imaging in step S608) corresponding to the pressing of the irradiation switch or may start imaging operations via the detection of radiation emitted from the radiation source 201. During radiation imaging, the control unit 180 controls the drive circuit 150, the reading circuit 160, and the signal processing unit 170 to obtain the detection values representing the irradiation dose from the detecting pixels at a predetermined timing and perform integration. In other words, at a predetermined timing for collecting AEC information during the radiation imaging (YES in step S707), the control unit 180 controls the drive circuit 150 and the reading circuit 160 and reads the signals of the detecting pixels. The calibration unit 172 of the signal processing unit 170 calibrates the read detection values obtained from the detecting pixels and obtains calibrated detection values (step S709). Note that the processing for calibrating the detection values by the calibration unit 172 will be described below in detail using the flowchart in FIG. 8. The calculating unit 171 performs integration of the post-calibration detection values obtained by the calibration unit 172 and calculates an integration value (step S710). In this manner, the integration value of the dose detected by the detecting pixels of the selected receptor field is obtained by the signal processing unit 170 (the calibration unit 172 and the calculating unit 171).

The control unit 180 of the radiation imaging apparatus 100 determines whether or not the integration value calculated in step S710 has reached the dose threshold specified by the imaging protocol information (step S711). When the integration value has not reached the threshold (NO in step S711), the processing returns to step S707 and radiation irradiation continues. When the integration value has reached the threshold (YES in step S711), the control unit 180 determines to end irradiation and transmits an end request signal to the radiation source control apparatus 202 via the communication I/F 181 (step S712). The radiation source control apparatus 202 causes the radiation source 201 to stop emitting radiation in response to the end request signal being received. Note that the dose set associated with the imaging protocol may be used unchanged as the dose threshold, but no such limitation is intended. For example, the control unit 180 may determine the dose threshold on the basis of the dose set associated with the imaging protocol, the communication delay between the units, processing delay, and the like. For example, the dose threshold may be set by subtracting, from the dose associated with the imaging protocol, the dose irradiated during the delay until the end request signal reaches the radiation source control apparatus 202 and during the delay required for calculations and the like by the signal processing unit 170. Also, when the radiation irradiation time has reached the maximum irradiation time associated with the imaging protocol, the radiation source control apparatus 202 stops radiation irradiation by the radiation source 201 without waiting for an end request signal from the radiation imaging apparatus 100.

After radiation irradiation has stopped, in the radiation imaging apparatus 100, the control unit 180 performs control to read the signals of the imaging pixels (step S713). In other words, the control unit 180 sequentially scans the drive lines 110 (drive lines 110 other than the detecting drive line 111) not connected with the detecting pixels 104 via the drive circuit 150 and reads out the image signals from the imaging pixels 101 using the reading circuit 160. With this operation, the radiation imaging apparatus 100 obtains a radiation image. The charge accumulated at the detecting pixels 104 is already read out during the radiation irradiation, and the signals from these pixels are not used in forming the radiation image. Here, the signal processing unit 170 (calculating unit 171) of the radiation imaging apparatus 100 treats the pixels connected to the detecting drive lines 111 as defective pixels and performs correction (step S714). Note that the method of correcting defective pixels is not particularly limited, and a known technique can be used. For example, by calculating the defective pixel values via interpolation from the values of the surrounding normal pixels that are not defective pixels, the values of the defective pixels can be estimated from the surrounding statistical characteristics using a defective pixel correction method, linear prediction, or the like, and a correction method and the like can be used. The signal processing unit 170 stores the radiation image with corrected defective pixels in the storage unit 173, and the control unit 180 transmits the radiation image stored in the storage unit 173 to the imaging control apparatus 250 via the communication I/F (step S715).

Figure 3:
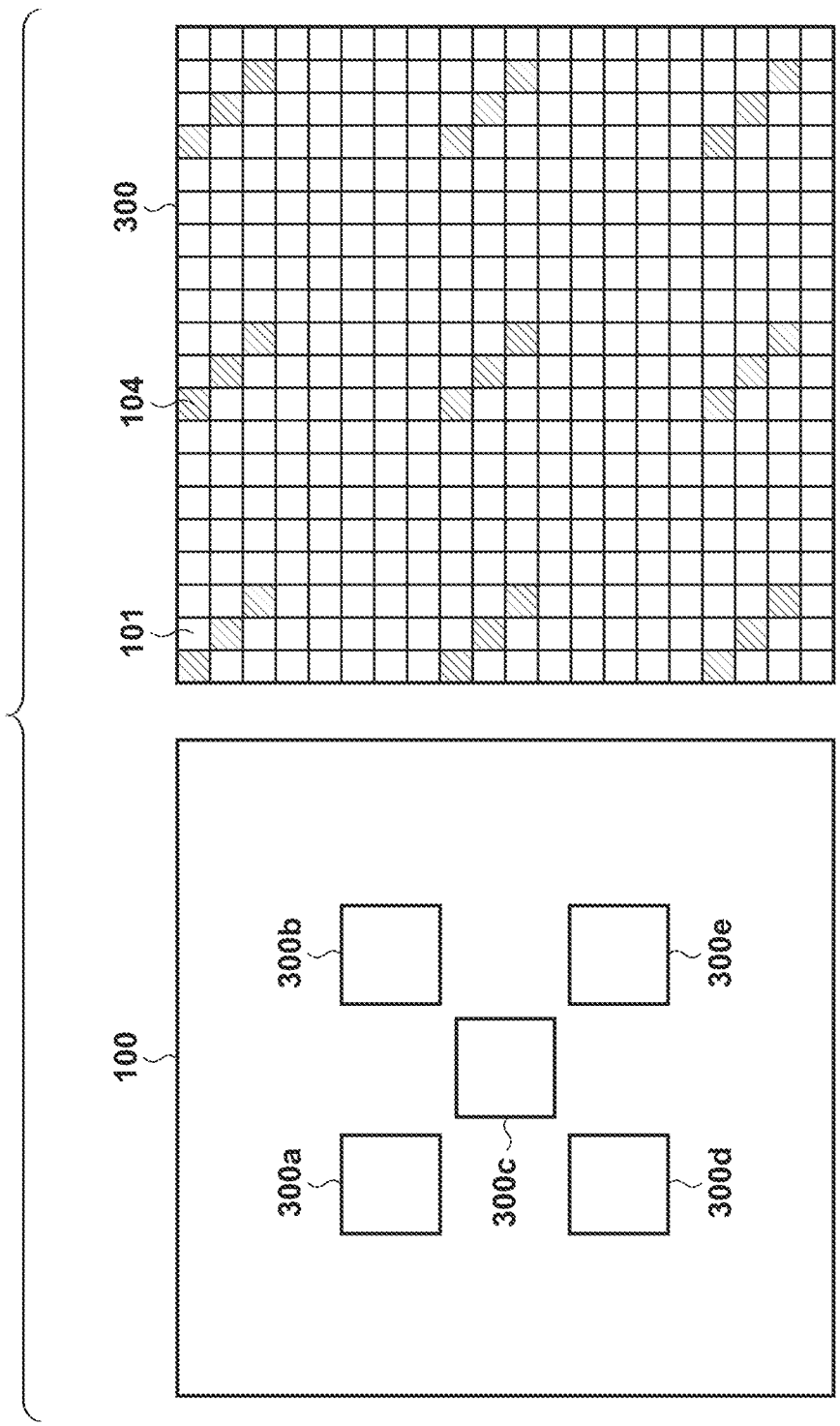
FIG. 3 is a diagram for describing a receptor field for AEC in a radiation imaging apparatus according to an embodiment.

Next, the receptor field according to the present embodiment will be described. FIG. 3 is a diagram illustrating an example of receptor fields 300a to 300e (hereinafter, may be referred to collectively as receptor fields 300) disposed in the radiation imaging apparatus 100 according to the present embodiment. The receptor fields 300 are defined as regions where a plurality of detecting pixels are disposed. The radiation imaging apparatus 100 according to the present embodiment is provided with the five rectangular receptor fields 300a to 300e. As described above, the imaging protocol information includes information relating to the receptor fields 300 used for AEC. For example, when the receptor fields 300a to 300c are specified to be used for AEC by the imaging protocol information, the detecting pixels within the receptor fields 300d and 300e are not used for AEC. The detecting pixels of the receptor fields 300d and 300e not used for AEC can be used as normal imaging pixels. Note that the receptor fields to be used for AEC may be selected automatically via imaging protocol selection or may be explicitly selected by the operator via the GUI.

The radiation dose during imaging is detected by the plurality of detecting pixels 104 disposed within the receptor fields 300 to be used for AEC, and AEC is performed. Also, various methods may be used for arranging the receptor fields 300. For example, by symmetrically disposing the receptor fields 300 with respect to the center of the radiation imaging apparatus 100, the effects of the orientation of the radiation in the radiation dose detection may be reduced or removed. Also, the shape of the receptor fields 300 is not limited to a rectangle (square or rectangle) as illustrated and may be a circle or an ellipse or a shape matching the shape of the body part to be imaged.

The AEC function of the radiation imaging apparatus 100 includes detecting the dose irradiated to the receptor fields 300 by reading out the output of the plurality of detecting pixels disposed within the receptor fields 300 during the radiation irradiation. If the output of the imaging pixels within the receptor fields 300 corresponds to the irradiated dose and the average output of the imaging pixels within the receptor fields 300 is equal to the average output of the detecting pixels 104 read out during irradiation, this means that the dose control during imaging by AEC is being accurately performed. However, when imaging is performed with the grid 205 installed on the radiation imaging apparatus 100, the output of the detecting pixels may be offset by the relationship between the sampling pitch (pixel size) of the pixels in the radiation imaging apparatus 100 and the grid density of the grid 205.

Figure 4:
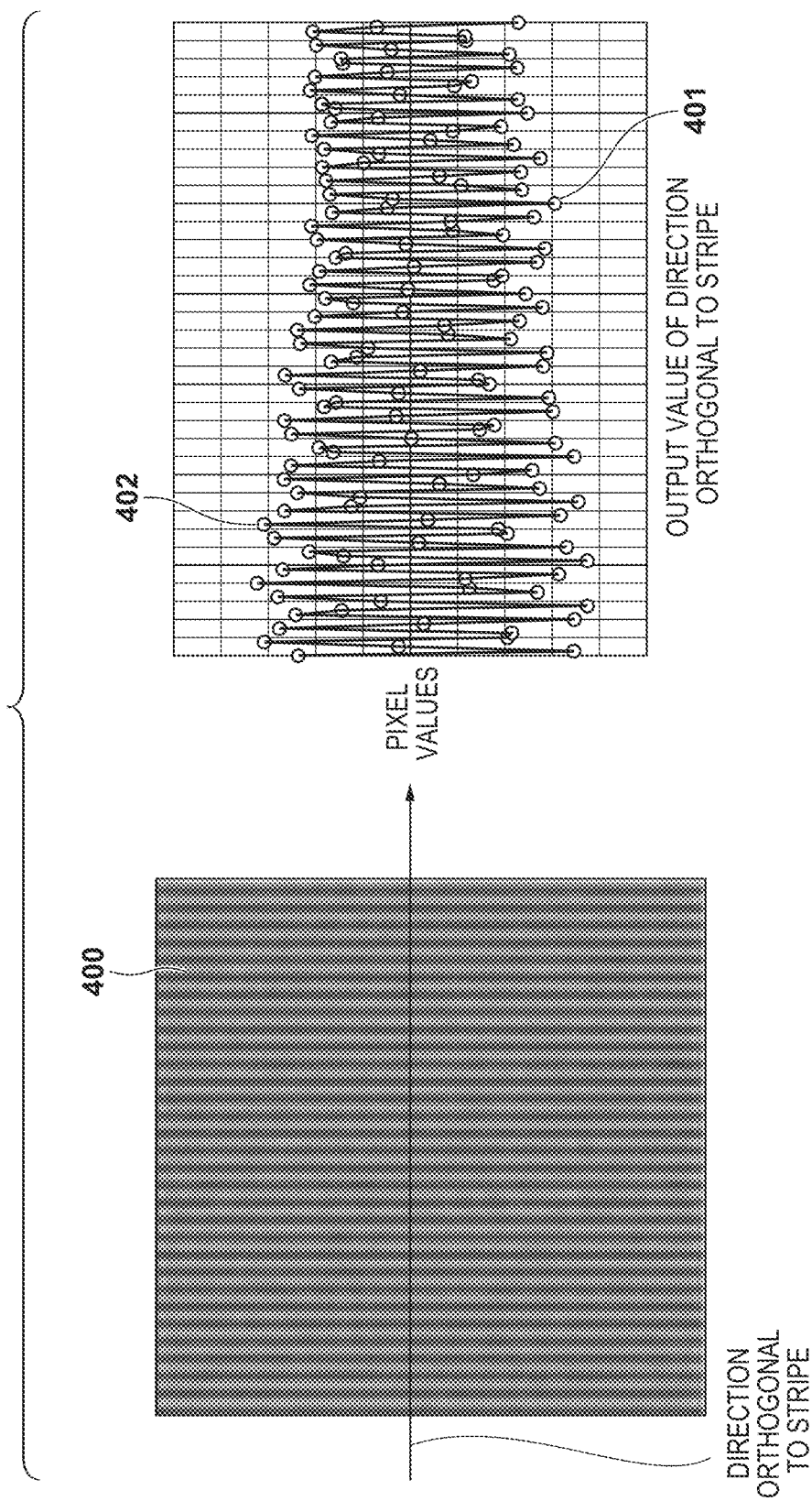
FIG. 4 is a diagram for describing the effects of a grid.

FIG. 4 is a diagram illustrating an example of the effects of a grid. Illustrated is a grid structure 400 that is the structure of the grid 205 in which radiation shielding material and radiation transparent material are alternately arranged in the lateral direction. In a radiation image captured using the grid 205 with the grid structure 400, vertical stripes (hereinafter, these stripes are referred to as grid stripes) are produced. This is because, though the radiation dose to be reached for pixels 401 that overlap the radiation shielding material of the grid 205 is reduced, the radiation dose to be reached for pixels 402 that overlap the radiation transparent material remains approximately the same. In other words, the output of the pixels 401 that overlap the radiation shielding material is reduced relative to the output of the pixels 402 that overlap the radiation transparent material, causing variation in the output depending on the position of the detecting pixels 104. This variation can be alleviated by obtaining the average from the output values of multiple detecting pixels 104. However, since the detecting pixels 104 are defective pixels in terms of the imaging pixels, preferably, a value close to the average output of the imaging pixels is calculated from a smaller number of detecting pixels 104 as possible.

Figure 5A:
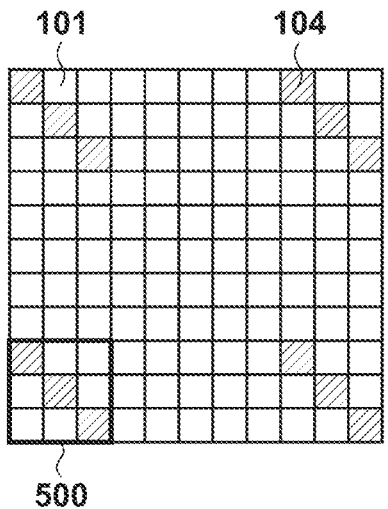
FIGS. 5A to 5G are diagrams for describing examples of arrangements of detecting pixels according to an embodiment.
Figure 5B:
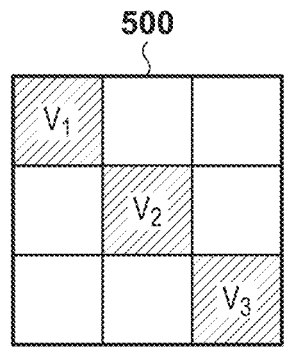
Figure 8:
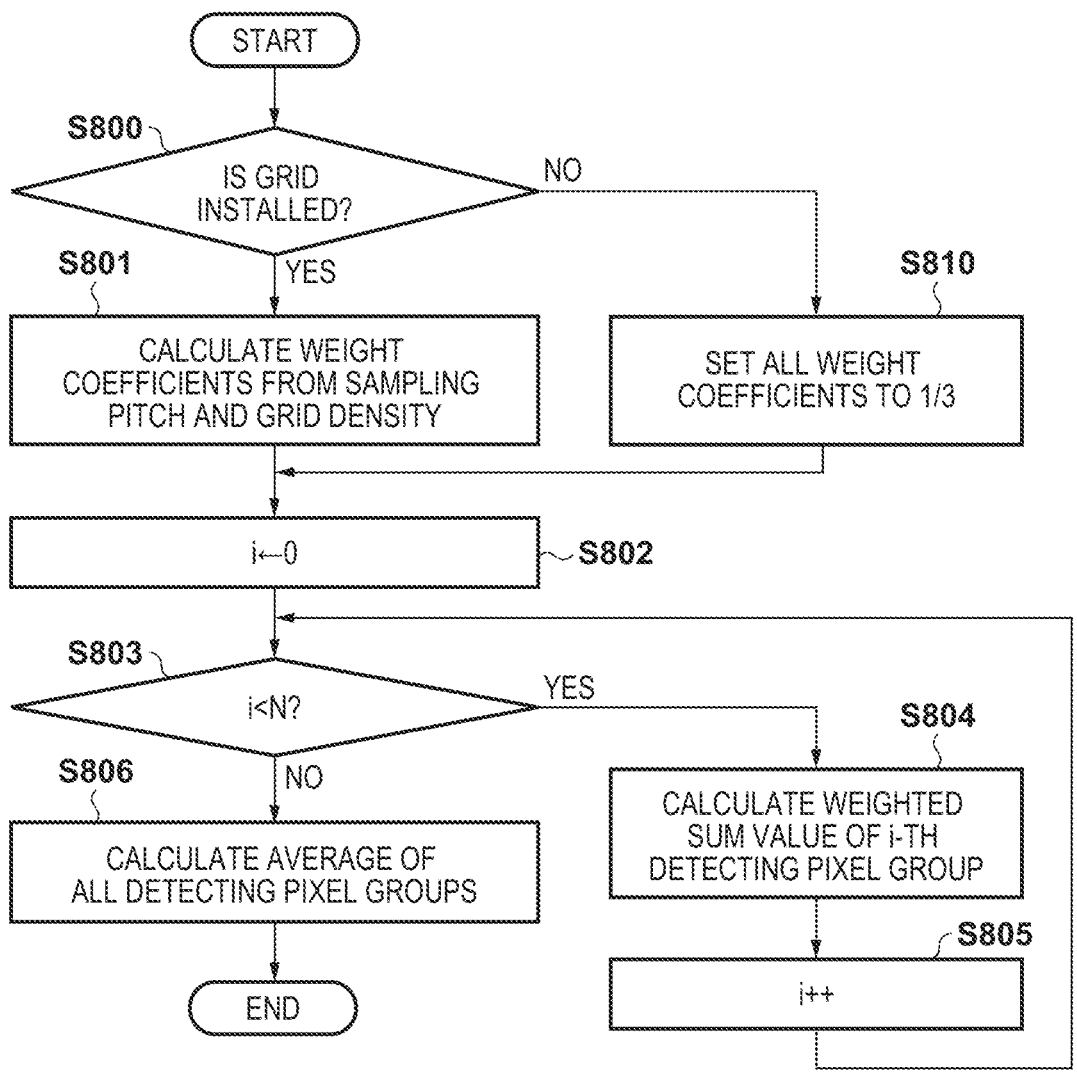
FIG. 8 is a flowchart illustrating the processing executed by a calibration unit according to an embodiment.

In the present embodiment, the calibration unit 172 reduces the frequency component relating to the grid stripes produced by the scattering ray removing grid included in the detection values for the irradiation amount of the radiation obtained from the plurality of detecting pixels 104 forming a detecting pixel group 500 (hereinafter, referred to as detection value calibration). Specifically, the calibration unit 172 uses filter processing including a filter characteristic for reducing the frequency component relating to the grid stripes to reduce the frequency component relating to the grid stripes of the detection values of the detecting pixels 104. For example, in the present embodiment, the receptor fields 300 used include a plurality of the detecting pixel groups 500 in which three detecting pixels are consecutively arranged in the diagonal direction as illustrated in FIG. 5A. The calibration unit 172 calibrates the detection values by finding the weighted sum of the signals obtained from the three consecutive pixels and reduces the effects of the grid stripes. Next, the processing according to the flowchart in FIG. 8 to reduce the effects of the grid stripes by the calibration unit 172 according to the present embodiment will be described. FIG. 8 is a flowchart illustrating the processing by the calibration unit 172 to calculate the dose detected by the detecting pixel groups and illustrating in detail the processing of step S709 described above. Note that in the description using the flowchart in FIG. 8, the total of detecting pixel groups 500 (FIG. 5A) belonging to the receptor field (receptor field selected to be used for AEC) specified in step S702 is N. Also, the outputs from the three detecting pixels 104 disposed in each detecting pixel group 500 are referred to as $V_1$, $V_2$, and $V_3$ as illustrated in FIG. 5B.

As described above, the signals read out from the detecting pixels 104 in real time during radiation irradiation (during imaging) are supplied to the signal processing unit 170 as detection values of the irradiation amount and calibrated at the calibration unit 172. Integration of the calibrated detection values is performed at the calculating unit 171, and when the integration value has reached the threshold, operations to stop irradiation are started. The calibration of the detection values by the calibration unit 172 will be described next. The calibration unit 172 first determines whether or not a grid is installed on the radiation imaging apparatus 100 (step S800). Whether or not a grid is installed can be determined by referencing the imaging protocol information, for example. Alternatively, whether or not a grid is installed may be determined via a grid detection result by the grid detection unit 190. When it is determined that a grid is installed (YES in step S800), the calibration unit 172 calculates weight coefficients a and b to use in calibration from the sampling pitch (mm) of the radiation imaging apparatus 100 and the grid density (number/cm) of the grid 205 to be used (step S801). The weight coefficients a and b will be described below in detail. Note that the grid density of the grid 205 is included in the imaging protocol information and is thus used by the calibration unit 172. When it is determined that a grid is not installed (NO in step S800), the calibration unit 172 does not perform calibration by finding the weighted sum in step S804 described below. In this case, the average value of the detection values obtained from the three detecting pixels forming the detecting pixel group is calculated by the calibration unit 172 using Formula (3) described below, and the coefficients a and b are set to ⅓ (step S810).

Figure 9A:
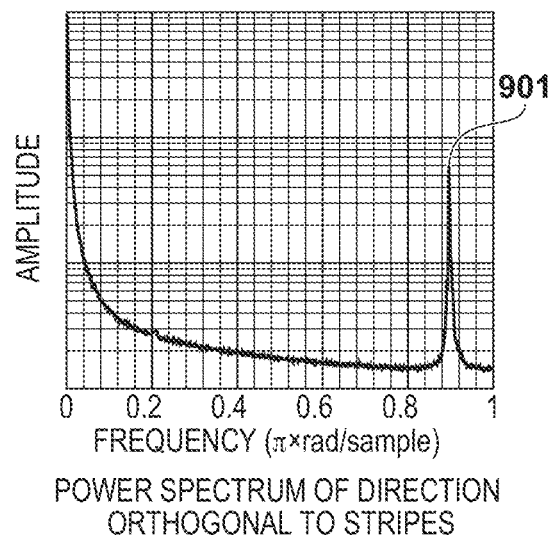

In step S801, the calibration unit 172 determines the weight coefficient to use in finding the weighted sum to reduce the effects of the grid 205. An example of a method for determining the weight coefficient will be described below. As illustrated in FIG. 9A, an amplitude spectrum of a direction orthogonal to the grid stripes has a characteristic grouped at a single frequency (901 in FIG. 9A). The weight coefficient is set to reduce this frequency component. For example, when the weight coefficients (filter coefficients) for finding the weighted sum (executing filter processing) of the three pixels is set to (b, a, b), the weight coefficients a and b can be calculated using the following Formula (1).

$$a = \begin{cases} 1 + \dfrac{1}{\cos\left(2\pi \cdot \dfrac{G}{10} \cdot S\right) - 1}, & \cos\left(2\pi \cdot \dfrac{G}{10} \cdot S\right) \neq 1 \\ \dfrac{1}{3}, & \text{otherwise} \end{cases} \quad (1)$$

$$b = \begin{cases} -\dfrac{1}{2 \cdot \left(\cos\left(2\pi \cdot \dfrac{G}{10} \cdot S\right) - 1\right)}, & \cos\left(2\pi \cdot \dfrac{G}{10} \cdot S\right) \neq 1 \\ \dfrac{1}{3}, & \text{otherwise} \end{cases}$$

Also, G represents the grid density (number/cm), and S represents the pixel sampling pitch (mm).

Figure 9B:
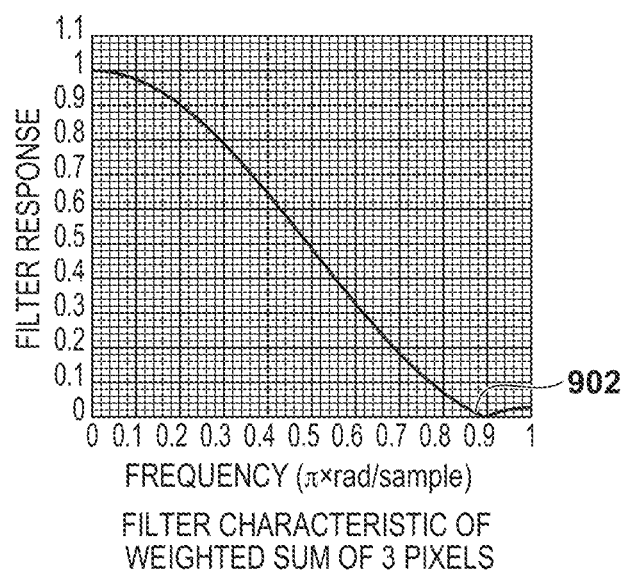

Here, the amplitude response of the filter characteristic of the weight coefficients (b, a, b) using Formula (1), as illustrated in FIG. 9B, is reduced (to approximately 0) at or near a frequency 902 which is the same frequency (grid frequency) of the grid stripes seen in the radiation image caused by the grid 205. Thus, by finding the weighted sum (executing filter processing) the values obtained from the detecting pixel group 500 using the weight coefficient obtained using Formula (1), the effects of the grid stripes can be reduced. In this manner, the calibration unit 172 calibrates the detection values of the irradiation amount of the radiation obtained from the plurality of detecting pixels forming the detecting pixel groups using a filter processing that reduces the output at the frequency of the grid stripes produced by the scattering ray removing grid. FIG. 9C is a diagram illustrating an example of output value 903 before calibration of the detecting pixel group and output value 904 of the detecting pixel group after calibration by finding the weighted sum of the three pixels. With the post-calibration output value 904, the variation in the output value caused by the grid stripes is reduced, and it can be seen that a stable output value can be obtained regardless of the position of the detecting pixel 104.

Note that the weight coefficient is calculated from the grid density and the sampling pitch using Formula (1), but the weight coefficients a and b may be calculated using the following Formula (2) from a grid frequency fg (rad/sample) on the image.

$$a = \begin{cases} 1 + \dfrac{1}{\cos(fg) - 1}, & \cos(fg) \neq 1 \\ \dfrac{1}{3}, & \text{otherwise} \end{cases} \quad (2)$$

$$b = \begin{cases} -\dfrac{1}{2 \cdot \cos(fg) - 1)}, & \cos(fg) \neq 1 \\ \dfrac{1}{3}, & \text{otherwise} \end{cases}$$

Here, the grid frequency fg is first calculated from the radiation image captured only of the grid 205 using the radiation imaging apparatus 100 by the imaging control apparatus 250, included in the imaging protocol information, and then communicated to the radiation imaging apparatus 100. The imaging control apparatus 250 includes the grid frequency fg in the imaging protocol information and communicates this to the radiation imaging apparatus 100. Steps S610 to S613 in FIG. 6 indicate the processing for measuring the grid frequency fg. When an instruction to measure the grid frequency is performed by an operator via the GUI provided on the display device 254, the imaging processing unit 252 receives the instruction via the operation unit 253 (step S610). The imaging processing unit 252 transmits an imaging instruction for measuring the grid frequency to the radiation imaging apparatus 100 and the radiation source control apparatus 202 via the communication I/F 251 (step S611). At this time, the imaging protocol information includes an instruction for a setting to not use any receptor fields so that all of the pixels are used as imaging pixels. Thereafter, radiation imaging is executed in steps S605 to S608 as described above and a radiation image for calculating the grid frequency fg is obtained from the radiation imaging apparatus 100 (step S612). The imaging processing unit 252 calculates the grid frequency fg from the radiation image obtained in step S612 (step S613).

Note that the method of calculating the grid frequency fg is not particularly limited, and a known method can be used. For example, the method in Japanese Patent Laid-Open No. 2014-150844 filed by the present applicant can be used. The method includes comparing power spectrums of a determined measuring region to detect the presence or absence of a grid, direction, and frequency. The details of the method are known via Japanese Patent Laid-Open No. 2014-150844 and thus are omitted. Note that the grid frequency can also be calculated on the basis of the grid density information, but the grid frequency can be obtained at a high accuracy by calculating from an actual captured image.

Returning to FIG. 8, the calibration unit 172 executes the processing of steps S802 to S805 on all of the detecting pixel groups (hereinafter, the total is represented by N) belonging to the receptor field (the receptor field selected in step S702) specified to be used in AEC by the imaging protocol information. The calibration unit 172 first initializes i to 0 (step S802) and then, when i is less than N (YES in step S803), calculates a weighted sum value $M_i$ from the i-th detecting pixel group using the following Formula (3) (step S804).

$$M_i = a \cdot V_2 + b \cdot (V_1 + V_3) \quad (3)$$

Note that when it is determined that there is no grid in step S800, in step S810, since the coefficients a and b are set to ⅓, the simple average value of the detection values ($V_1$, $V_2$, and $V_3$) obtained from the three detecting pixels using Formula (3) is calculated as $M_i$. Subsequently, the calibration unit 172 increments i (step S805) and repeats the processing of step S804 while i is less than N (while YES is determined in step S803), that is until the calculations for all of the detecting pixel groups are complete. When $M_i$ is calculated for all of the detecting pixel groups (N number of detecting pixel groups) belonging to the receptor field selected in step S702 (NO in step S803), the calibration unit 172 calculates an average value V of the N number of values $M_i$ calculated in step S804 using the following Formula (4) (step S806). The calibration unit 172 calculates the average value V for each receptor field set to be used and provides them to the calculating unit 171.

$$V = \frac{1}{N} \sum_{i=0}^{N-1} M_i \quad (4)$$

The calculating unit 171 accumulates the values V provided from the calibration unit 172 and obtains an accumulated value for the detection values corresponding to the irradiation dose (step S710). Then, the control unit 180 compares the accumulated value and a threshold and, when the accumulated value is greater than the threshold, performs control (outputs an end request signal) to stop the radiation emission by the radiation source 201 (steps S711 and S712). Note that in the example described above, the values obtained by averaging detection values obtained from all of the detecting pixels belonging to the receptor fields used for AEC are accumulated, but no such limitation is intended. For example, the average value of the calibrated detection values for each selected receptor field may be obtained, and the accumulated value may be calculated for each receptor field. In this case, when the accumulated value is greater than the threshold for a predetermined number of the receptor fields to be used for AEC, end irradiation may be determined.

Figure 5C:
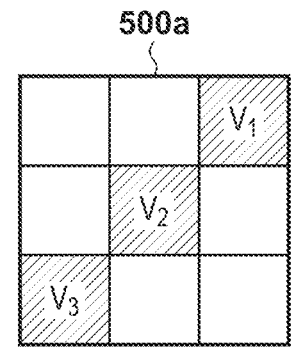

Note that in the present embodiment described above, the arrangement of the detecting pixels in the detecting pixel group 500 is as in FIG. 5B. However, no such limitation is intended. For example, as illustrated in detecting pixel group 500a in FIG. 5C, the detecting pixels may be consecutively diagonally arranged in a direction different from that of the detecting pixel group 500. The detecting pixel group 500 and the detecting pixel group 500a may also be mixed.

Figure 5D:
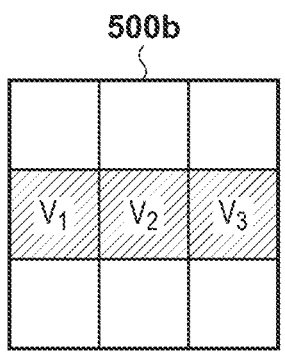
Figure 5E:
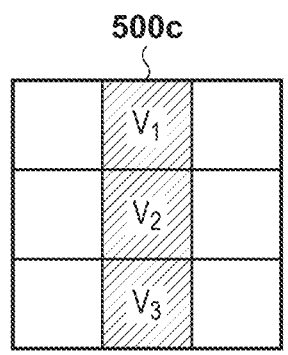

Also, the processing described above can be applied using detecting pixel groups 500b or 500c with three detecting pixels consecutively arranged in row direction or the column direction as illustrated in FIGS. 5D and 5E. However, with the detecting pixel group 500b with the detecting pixels arranged in the row direction illustrated in FIG. 5D, calibration is possible when the grid stripes are vertical stripes. Also, with the detecting pixel group 500c with the detecting pixels arranged in the column direction illustrated in FIG. 5E, calibration is possible when the grid stripes are horizontal stripes. Accordingly, the detecting pixel groups 500 and 500a (FIGS. 5B and 5C) with the detecting pixels arranged in diagonal directions may be preferable because they are compatible with grid stripes in both the vertical and horizontal directions. Also, the detecting pixels may be arranged in a cross shape of the combined arrangement of FIGS. 5D and 5E. In this case, the weighted sum may be found as described above for both the horizontal direction detecting pixel group and the vertical direction detecting pixel group, two detection values may be obtained, and the average value of these may be taken as the detection value for the cross-shaped detecting pixel group.

Figure 5F:
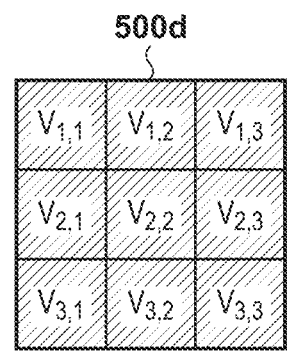

Another example arrangement that can be used includes detecting pixel group 500d in which a 3×3 group of pixels are all the detecting pixels 104 as illustrated in FIG. 5F. In this case, the weight coefficients a and b obtained as described above may be used, and the weighted sum may be found using the following Formula (5), for example. Note that in Formula (5), the output values of the detecting pixels in the consecutive 3 rows and 3 columns are $V_{k,l}$ (k=1, 2, 3, l=1, 2, 3), the grid density is G (number/cm), and the sampling pitch is S (mm).

$$M_i = a^2 \cdot V_{2,2} + ab \cdot (V_{1,2} + V_{2,1} + V_{2,3} + V_{3,2}) + b^2(V_{1,1} + V_{1,3} + V_{3,1} + V_{3,3}) \quad (5)$$

Figure 5G:
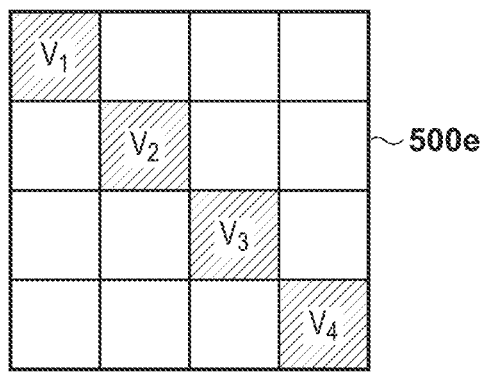

Also, the number of consecutive detecting pixels is not limited to three and may be four or more. In other words, it is only required that three or more detecting pixels are consecutively arranged in at least one of the row direction, column direction, or diagonal direction to form a detecting pixel group. When the detecting pixel group includes four or more detecting pixels, the weighted sum may be found using an extension on the concepts described above. For example, as illustrated in FIG. 5G, when a detecting pixel group 500e includes four detecting pixels (the values obtained from the detecting pixels corresponding to $V_1$ to $V_4$), the weighted sum value may be calculated as follows. That is, the average of a weighted sum value obtained using $V_1$ to $V_3$ and the weight coefficients a and b and a weighted sum value obtained using $V_2$ to $V_4$ and the weight coefficients a and b is calculated (Formula (6)) and taken as the weighted sum value of the detecting pixel group 500e.

$$M_i = \frac{1}{2}[(a \cdot V_2 + b \cdot (V_1 + V_3)) + (a \cdot V_3 + b \cdot (V_2 + V_4))] \quad (6)$$

Note that the calibration unit 172, when calculating the weight coefficient (step S801), obtains the information indicating the grid characteristics (grid density or grid frequency) from the imaging protocol information, but the present disclosure is not limited thereto. For example, a function may be provided for identifying the grid 205 to be used by the grid detection unit 190, and the calibration unit 172 may obtain the grid density on the basis of the identification result from the grid detection unit 190. In this case, for example, a table in which the grid identification information and the grid density are associated together may be stored in the storage unit 173, and the calibration unit 172 may obtain the grid density by referencing the table. Note that the identification information of the grid 205 may be obtained from the imaging protocol information as a part of the information indicating the grid characteristics. Alternatively, the radiation imaging apparatus 100 may be notified of the weight coefficient from the imaging control apparatus 250. In this case, the imaging control apparatus 250 includes the weight coefficients a and b in the imaging protocol information to be transmitted to the radiation imaging apparatus 100. Also, in this case, the imaging control apparatus 250 obtains the weight coefficients a and b by the method described above on the basis of the grid density of the grid 205 to be used and the sampling pitch of the radiation imaging apparatus 100 or on the basis of the grid frequency obtained in step S613.

As described above, according to the techniques of the present disclosure, by finding the weighted sum of the outputs of the detecting pixels according to the grid density, the effects of the grid can be reduced and the accuracy of the AEC can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-128385, filed Aug. 10, 2022, which is hereby incorporated by reference herein in its entirety.

What is claimed is:

1. A radiation imaging apparatus, comprising:
at least one processor; and
at least one memory storing instructions, which when executed by the processor, cause the radiation imaging apparatus to:

convert radiation into electrical signals, one or more of the plurality of pixels being configured to operate as a detecting pixel for detecting irradiation amounts of the radiation;

reduce a frequency component relating to grid stripes produced by a scattering ray removing grid included in detection values for the irradiation amount of the radiation obtained from the plurality of detecting pixels forming a detecting pixel group; and reduce the frequency component relating to the grid stripes from a plurality of the detection values read at different times during irradiation.

2. The radiation imaging apparatus according to claim 1, wherein the instructions, when executed by the processor, further cause the radiation imaging apparatus to:

reduce the frequency component relating to the grid stripes by using filter processing including a filter characteristic for reducing the frequency component relating to the grid stripes.

3. The radiation imaging apparatus according to claim 2, wherein the instructions, when executed by the processor, further cause the radiation imaging apparatus to:

obtain a weight coefficient for the filter processing on a basis of information indicating a characteristic of the scattering ray removing grid.

4. The radiation imaging apparatus according to claim 3, wherein the instructions, when executed by the processor, further cause the radiation imaging apparatus to:

obtain the information indicating the characteristic of the scattering ray removing grid.

5. The radiation imaging apparatus according to claim 3, wherein the information indicating the characteristic of the scattering ray removing grid includes identification information of the scattering ray removing grid, and wherein the instructions, when executed by the processor, further cause the radiation imaging apparatus to obtain weighting information on a basis of the identification information of the scattering ray removing grid.

6. The radiation imaging apparatus according to claim 3, wherein the information indicating the characteristic of the scattering ray removing grid includes a grid density of the scattering ray removing grid, and wherein the instructions, when executed by the processor, further cause the radiation imaging apparatus to obtain the weight coefficient on a basis of the grid density of the scattering ray removing grid and a sampling pitch of the radiation detector.

7. The radiation imaging apparatus according to claim 6, wherein the detecting pixel group includes three detecting pixels consecutive in at least a row direction, a column direction, or a diagonal direction, and wherein the instructions, when executed by the processor, further cause the radiation imaging apparatus to obtain a detection value V with a reduced frequency component relating to the grid stripes using $$V = a \cdot V_2 + b \cdot (V_1 + V_3)$$
$$a = 1 + \frac{1}{\cos\left(2\pi \cdot \frac{G}{10} \cdot S\right) - 1}, b = -\frac{1}{2 \cdot \left(\cos\left(2\pi \cdot \frac{G}{10} \cdot S\right) - 1\right)}$$

where $V_k$ (k=1, 2, 3) represents output values of the three detecting pixels, G (number/cm) represents the grid density, and S (mm) represents the sampling pitch; or the detecting pixel group includes consecutive detecting pixels in 3 rows and 3 columns, and wherein the instructions, when executed by the processor, further cause the radiation imaging apparatus to obtain a detection value V with a reduced frequency component relating to the grid stripes using $$V = a^2 \cdot V_{2,2} + ab \cdot (V_{1,2} + V_{2,1} + V_{2,3} + V_{3,2}) + b^2 \cdot (V_{1,1} + V_{1,3} + V_{3,1} + V_{3,3})$$
$$a = 1 + \frac{1}{\cos\left(2\pi \cdot \frac{G}{10} \cdot S\right) - 1}, b = -\frac{1}{2 \cdot \left(\cos\left(2\pi \cdot \frac{G}{10} \cdot S\right) - 1\right)}$$

where $V_{k,l}$ (k=1, 2, 3, l=1, 2, 3) represents output values of the detecting pixels in 3 rows and 3 columns, G (number/cm) represents the grid density, and S (mm) represents the sampling pitch.

8. The radiation imaging apparatus according to claim 3, wherein the information indicating the characteristic of the scattering ray removing grid includes a grid frequency which is a frequency of grid stripes shown in a radiation image caused by the scattering ray removing grid, and wherein the instructions, when executed by the processor, further cause the radiation imaging apparatus to obtain the weight coefficient on a basis of the grid frequency.

9. The radiation imaging apparatus according to claim 8, wherein the detecting pixel group includes three detecting pixels consecutive in at least a row direction, a column direction, or a diagonal direction, and wherein the instructions, when executed by the processor, further cause the radiation imaging apparatus to obtain a detection value V with a reduced frequency component relating to the grid stripes using $$V = a \cdot V_2 + b \cdot (V_1 + V_3)$$
$$a = 1 + \frac{1}{\cos(fg) - 1}, b = -\frac{1}{2 \cdot (\cos(fg) - 1)}$$

where $V_k$ (k=1, 2, 3) represents output values of the three detecting pixels and fg (rad/sample) represents the grid frequency; or the detecting pixel group includes consecutive detecting pixels in 3 rows and 3 columns, and wherein the instructions, when executed by the processor, further cause the radiation imaging apparatus to obtain a detection value V with a reduced frequency component relating to the grid stripes using $$V = a^2 \cdot V_{2,2} + ab \cdot (V_{1,2} + V_{2,1} + V_{2,3} + V_{3,2}) + b^2 \cdot (V_{1,1} + V_{1,3} + V_{3,1} + V_{3,3})$$
$$a = 1 + \frac{1}{\cos(fg) - 1}, b = -\frac{1}{2 \cdot (\cos(fg) - 1)}$$

where $V_{k,l}$ (k=1, 2, 3, l=1, 2, 3) represents output values of the detecting pixels in 3 rows and 3 columns and fg (rad/sample) represents the grid frequency.

10. The radiation imaging apparatus according to claim 2, wherein the instructions, when executed by the processor, further cause the radiation imaging apparatus to:

obtain a weight coefficient for the filter processing.

11. The radiation imaging apparatus according to claim 1, wherein a region including one or more of the detecting pixel groups is defined as a receptor field, and wherein the instructions, when executed by the processor, further cause the radiation imaging apparatus to execute processing to reduce a frequency component relating to the grid stripes on detection values from all of the detecting pixel groups belonging to the receptor field and obtains an average to obtain a detection value by the receptor field.

12. The radiation imaging apparatus according to claim 11, wherein the instructions, when executed by the processor, further cause the radiation imaging apparatus to:
select at least one receptor field from a plurality of the receptor fields,
reduce a frequency component relating to the grid stripes for detection values from all detecting pixels belonging to at least one receptor field of all receptor fields selected from among the plurality of receptor fields and obtains an average to obtain a detection value by the at least one receptor field, and
reduce a frequency component relating to the grid stripes for detection values from all detecting pixels belonging to each receptor field selected from among the plurality of receptor fields and obtains an average to obtain a detection value for each receptor field selected.

13. The radiation imaging apparatus according to claim 1, wherein the instructions, when executed by the processor, further cause the radiation imaging apparatus to:
determine whether or not to use a grid, and
when it is determined not to use a grid, not execute processing to reduce a frequency component relating to the grid stripes.

14. The radiation imaging apparatus according to claim 1, wherein the instructions, when executed by the processor, further cause the radiation imaging apparatus to:
obtain an integrated irradiation amount for automatic exposure control on a basis of a detection value with a frequency component relating to the reduced grid stripes, and
output a signal requesting to stop radiation irradiation when the integrated irradiation amount is greater than a threshold.

15. The radiation imaging apparatus according to claim 1, wherein the instructions, when executed by the processor, further cause the radiation imaging apparatus to:
obtain a radiation image from a plurality of imaging pixels which are the plurality of pixels minus the detecting pixels and pixels connected in an identical row to the detecting pixels, and
interpolate an image corresponding to a row where the detecting pixels are connected on a basis of the radiation image.

16. The radiation imaging apparatus according to claim 1, wherein in the radiation detector, the plurality of detecting pixels forming the detecting pixel group are consecutively arranged in at least one of a row direction, a column direction, or a diagonal direction.

17. A radiation imaging system including the radiation imaging apparatus according to claim 1 and an information processing apparatus configured to connect to the radiation imaging apparatus, comprising:
at least one processor; and
at least one memory storing instructions, which when executed by the processor, cause the radiation imaging system to:
obtain an integrated irradiation amount for automatic exposure control on a basis of a detection value with a frequency component relating to the reduced grid stripes; and
end radiation irradiation on a basis of the integrated irradiation amount.

18. The radiation imaging apparatus according to claim 1, wherein
the plurality of detecting pixels forming the detecting pixel group are arranged in a cross shape that is a combination of a horizontal direction detecting pixel group and a vertical direction detecting pixel group, and
the detection values are average value of two detection values obtained by weighting and adding each of the horizontal direction detecting pixel group and the vertical direction detecting pixel group.

19. A method of controlling a radiation imaging apparatus including a radiation detector including a plurality of pixels configured to convert radiation into electrical signals, one or more of the plurality of pixels being configured to operate as a detecting pixel for detecting irradiation amounts of the radiation, the method comprising:
reducing a frequency component relating to grid stripes produced by a scattering ray removing grid included in detection values for the irradiation amounts of the radiation obtained from the plurality of detecting pixels forming a detecting pixel group, and
reducing the frequency component relating to the grid stripes from a plurality of the detection values read at different times during irradiation.

20. A non-transitory computer-readable storage medium storing a program for causing a computer to execute the method of controlling according to claim 19.

* * * * *